United States Patent
Peiffer et al.

(10) Patent No.: US 6,617,035 B2
(45) Date of Patent: Sep. 9, 2003

(54) HOT-STERILIZABLE, BIAXIALLY ORIENTED POLYESTER FILM WITH GOOD METAL ADHESION, ITS USE AND PROCESS FOR ITS PRODUCTION

(75) Inventors: Herbert Peiffer, Mainz (DE); Stefan Bartsch, Wiesbaden (DE); Richard Lee Davis, Wiesbaden (DE)

(73) Assignee: Mitsubishi Polyester Film GmbH (DE)

( * ) Notice: Subject to any disclaimer, the term of this patent is extended or adjusted under 35 U.S.C. 154(b) by 0 days.

(21) Appl. No.: 10/014,682

(22) Filed: Dec. 11, 2001

(65) Prior Publication Data

US 2002/0127414 A1 Sep. 12, 2002

(30) Foreign Application Priority Data

Dec. 16, 2000  (DE) .......................................... 100 62 981

(51) Int. Cl.⁷ ............................ B32B 9/04; B32B 27/36; B29C 55/12; B05D 3/00
(52) U.S. Cl. ........................ 428/446; 428/480; 428/332; 428/336; 428/337; 428/343; 428/355 R; 427/299; 427/385.5; 264/290.2
(58) Field of Search .................................. 428/446, 480, 428/332, 336, 337, 343, 355 R; 427/299, 407.1, 419.2, 385.5; 264/290.2; 525/437, 444, 445

(56) References Cited

U.S. PATENT DOCUMENTS

| | | | |
|---|---|---|---|
| 3,563,942 A | | 2/1971 | Heiberger |
| 3,779,993 A | | 12/1973 | Kibler et al. |
| 4,921,764 A | * | 5/1990 | Rudd et al. ................. 428/480 |
| 6,214,440 B1 | * | 4/2001 | Peiffer et al. ............... 428/141 |
| 6,358,604 B1 | * | 3/2002 | Peiffer et al. ............... 428/336 |
| 2002/0106506 A1 | * | 8/2002 | Kumano et al. ............. 428/343 |

FOREIGN PATENT DOCUMENTS

| | | |
|---|---|---|
| EP | 0 144 978 A2 | 6/1985 |
| EP | 0 602 964 B1 | 3/1998 |

\* cited by examiner

Primary Examiner—Robert Dawson
Assistant Examiner—Michael J Feely
(74) Attorney, Agent, or Firm—ProPat, L.L.C.

(57) ABSTRACT

The invention relates to a hot-sterilizable, biaxially oriented polyester film with good metal adhesion, with a base layer B containing at least 80% by weight of thermoplastic polyester, and with at least one adhesive layer which contains a mixture or a blend of two components I and II, wherein component I of the mixture or the blend contains a polyethylene terephthalate copolymer, which contains a sulfomonomer and wherein component II of the mixture or the blend contains acrylic copolymer.

8 Claims, No Drawings

HOT-STERILIZABLE, BIAXIALLY ORIENTED POLYESTER FILM WITH GOOD METAL ADHESION, ITS USE AND PROCESS FOR ITS PRODUCTION

BACKGROUND OF THE INVENTION

The invention relates to a hot-sterilizable, biaxially oriented polyester film with at least a base layer B containing a minimum of 80% by weight of thermoplastic polyester and at least an adhesive layer containing a mixture of the two components I and II. The invention also relates to a process for the production and to the use of this film.

EP-A-0 144 978 describes a self-supporting, oriented film made from a thermoplastic synthetic material, where the film has a continuous polyester coating on at least one of its two surfaces, which is applied to the film in the form of an aqueous dispersion before the final orientation step is done. The polyester coating consists of a condensation product of various derivatives capable of forming polyesters, such as isophthalic acid, aliphatic dicarboxilic acid, sulfonomers and aliphatic or cycloaliphatic glycol. The film has good metal adhesion, it is, however, not sterilizable due to a lack of steam resistance.

EP-A-0 144 978 describes a self-supporting, oriented film made from a thermoplastic synthetic material, where the film has, on at least one of its two surfaces, a continuous, cross-linked, acrylate-containing coating, which may also be applied to the film in the form of an aqueous dispersion before the final orientation step is done. The acrylate-containing coating consists of copolymers with at least 50% by weight of acrylic and/or methacrylic monomers, 1 to 15% by weight of monomers containing a functional group capable of forming intermolecular cross-linkings, when in a copolymerised state and under the influence of elevated temperatures, and of up to 49% by weight of one or several mono ethylenically unsaturated monomer, free of halogen, wherein the percentages are based on the total weight of the copolymers forming the adhesive layer. The film has good sterilizing properties, but poor metal adhesion.

It was the object of the present invention to provide a hot-sterilizable, especially a steam-sterilizable, biaxially-oriented polyester film with an adhesive layer with good adhesion properties to metal. A special object of this invention was to set the metal adhesion of the film such that the metallized film can be simultaneously sterilized when treated with steam. Moreover, the film according to the invention shall be processable on high-speed processing machines. It was another object that during film production up to 60% by weight of the waste material resulting from the film production can be reused as regrind for extrusion, without negatively affecting the physical properties of the film so produced.

BRIEF SUMMARY OF THE INVENTION

This object has been achieved by providing a hot-sterilizable, biaxially oriented polyester film of the kind previously mentioned, wherein the adhesive layer contains a mixture, respectively a blend of the two components I and II, with component I being a copolyester and component II being an acrylically and/or methacrylically cross-linked copolymer, described below in more details.

Surprisingly, by using a mixture, respectively a blend of components I and II the desired combination of good metal adhesion and sterilizability could be achieved. The weight ratio of the used components to one another is I:II=5:95 to I:II=95:5, preferably I:II=10:90 to I:II=90:10 and especially preferred I:II=15:85 to I:II=85:15.

DETAILED DESCRIPTION OF THE INVENTION

Mixtures within the scope of the present invention are mechanical mixtures made from the individual components. In general the individual components are initially combined for this purpose in the form of pressed molded articles of small size, e.g. lenticular or spherical granulate, mechanically mixed thereafter using a suitable vibrating device and then dissolved in water. Another way of producing the mixture is to initially dissolve the granulated components I and II, each individually, to obtain an aqueous solution, and then mix the aqueous solutions before applying them to the film.

A blend in the sense of the present invention is an alloy-like combination of the individual components I and II which can no longer be decomposed into its original components. A blend has the same properties as a homogeneous material and can be characterised accordingly by suitable parameters.

According to the invention the film has at least a base layer B. A preferred embodiment of the invention has a three-layered structure and has in addition to base layer B the cover layers A and C. Moreover, additional intermediate layers can be present between base layer B and cover layers A and C.

Base layer B contains a minimum of 90% by weight of thermoplastic polyester. Suitable polyesters are made from ethylene glycol and terephthalic acid (=polyethylene terephthalate, PET), from ethylene glycol and naphthalene-2,6-dicarboxilic acid (=polyethylene-2,6-naphthalate, PEN), from 1,4-bis-hydroxymethyl-cyclohexane and terephthalicacid [=poly(1,4-cyclohexanedimethylene terephthalate), PCDT] as well as from ethylene glycol, naphthalene-2,6-dicarboxilic acid and biphenyl-4,4'-dicarboxilic acid (polyethylene-2,6-naphthalatebibenzoate, PENBB). Special preference is given to polyesters consisting of at least 90 mol %, preferably of at least 95 mol % of ethylene glycol and terephthalic acid units or of ethylene glycol and naphthalene-2,6-dicarboxilic acid units. The remaining monomer units may be selected from other aliphatic, cycloaliphatic or aromatic diols, respectively dicarboxilic acids, which may also be present in cover layer A (or cover layer C).

Other suitable aliphatic diols are, as an example, diethylene glycol, triethylene glycol, aliphatic glycols with the general formula HO—$(CH_2)_n$—OH, with n being an integer from 3 to 6 (propane-1,3-diol, butane-1,4-diol, pentane-1,5-diol and hexane-1,6-diol) or branched aliphatic glycols with up to 6 carbon atoms. Among the group of cycloaliphatic diols, cyclohexanediols (especially cyclohexane-1,4-diol) are worth mentioning. Other suitable aromatic diols, for example, correspond to the formula HO—$C_6H_4$—X—$C_6H_4$—OH, where X represents —$CH_2$—, —$C(CH_3)_2$—, —$C(CF_3)_2$—, —O—, —S— or —$SO_2$—. Along with that, bisphenols of the formula HO—$C_6H_4$—$C_6H_4$—OH are well suited.

Other dicarboxylic acids are preferably benzene dicarboxilic acids, naphthalene dicarboxilic acids (for example naphthalene-1,4'- or 1,6-dicarboxilic acid), biphenyl-x,x'-dicarboxilic acids (especially biphenyl-4,4'-dicarboxilic acid), diphenylacetylene-x,x'-dicarboxilic acids (especially diphenylacetylene-4,4'-dicarboxilic acid) or stilbene-x,x'-dicarboxilic acids. Among the cycloaliphatic dicarboxilic acids, cyclohexanedicarboxilic acids (especially cyclohexane-1,4-dicarboxilic acid) are worth mentioning. Among the aliphatic dicarboxilic acids, the ($C_3$–$C_{19}$) alkane diacids are especially suitable, wherein the alkane portion can be linear or branched.

The polyesters can be produced, e.g., according to the ester interchange process. This is based on the use of dicarboxilic acid esters and diols, which are reacted with conventional ester interchange catalysts, such as zinc-, calcium-, lithium-, magnesium- and manganese salts. The intermediate products are then polycondensated in the presence of customary polycondensation catalysts, such as antimontrioxide or titanium salts. These may just as well be produced according to the ester interchange process in the presence of polycondensation catalysts, where dicarboxilic acids and diols directly react with each other.

For the intermediate layers and for cover layers A and C basically the same polymers can be used as for base layer B. At the same time cover layers A and C may also contain different materials, wherein the cover layers then preferably consist of polyesters, which in turn contain ethylene-2,6-naphthalate units and ethylene terephthalate units. Up to 30 mol % of the polymers may consist of additional comonomers. In a preferred embodiment of the invention the coated cover layer may contain a mixture of polymers, a copolymer or a homopolymer made from ethylene isophthalate units. Surprisingly, this results in a very good metal adhesion.

An additional intermediate layer may optionally be present between base layer B and cover layer(s) A and C. It may consist of the polymers previously described for base layer B. An especially preferred embodiment is made from the same polyester as is used for base layer B. It may also contain the previously described customary additives. The thickness of the intermediate layer is generally greater than 0.3 μm and preferably ranges from 0.5 to 15 μm, especially preferred from 1.0 to 10 μm.

The thickness of cover layer(s) A and C is generally greater than 0.1 μm and preferably ranges from 0.2 to 5 μm, especially preferred from 0.2 to 4 μm, where cover layers A and C can have the same or a different thickness.

The total thickness of the polyester film according to the invention can vary within a wide range and depends on the intended application of the film. It is preferably within the range from 4 to 300 μm, especially preferred from 5 to 250 μm, even more preferred from 6 to 200 μm, with the base layer B having a portion of preferably 40 to 95% of the total thickness.

Base layer B and the other layers may additionally contain conventional additives, such as antiblocking agents and other fillers. It is useful to add them to the polymer, respectively the polymer mixture, prior to the melting process. Phosphorous compounds, such as phosphoric acid or phosphoric acid esters, are used as stabilizers.

Typical antiblocking agents (referred to as pigments in this context) are inorganic and/or organic particles, such as calcium carbonate, amorphous silicic acid, pyrogene silicic acid, spherical silica particles, talcum, magnesium carbonate, barium carbonate, calcium sulfate, barium sulfate, lithium phosphate, calcium phosphate, magnesium phosphate, aluminum oxide, lithium fluoride, calcium-, barium-, zinc- or manganese salts of the dicarboxilic acids used, carbon black, titanium dioxide, kaolin or crosslinked polymer particles, such as polystyrol or acrylate particles.

Mixtures of two or more different antiblocking agents of the same composition but of a different particle size can also be chosen as additives. These particles can be added to the polymers of the individual layers at suitable concentrations in each case, for example in the form of a glycolic dispersion during the polycondensation or by way of masterbatches during the extrusion. Pigment concentrations of 0 to 25% by weight (based on the weight of the individual layer) have proven especially suitable. A detailed description of the anti-blocking agents can be found in EP-A-0 602 964.

According to the invention at least one side of the film is coated with an adhesive layer. Once the film is produced its coating has a thickness lying within the range from 5 to 2000 nm, preferably from 10 to 500 nm, especially preferred from 20 to 200 nm. The coating is preferably applied in-line, i.e. during the film production, advantageously prior to transverse orientation. Application by the reverse gravure roll coating method is particularly preferred, a method which allows extremely uniform application of the coating at layer thicknesses of up to 100 nm. Equally preferred is the application via the Meyer-Rod-method, a procedure with which greater coating thicknesses can be achieved. By means of the mentioned coatings the film surfaces obtain the desired properties, and optionally additional properties, the film can thus become sealable, printable, anti static or can be provided with an improved aroma barrier or permit adhesion to materials, which normally would not adhere to the surface of the film (e.g. photographic emulsions).

The mentioned materials/compositions are initially applied to one or both film surfaces in the form of a diluted solution, suspension or dispersion, preferably as an aqueous solution, an aqueous suspension or an aqueous dispersion, the solvent thereof is evaporated thereafter. If the coatings are applied in-line, after the longitudinal orientation and prior to the transverse orientation, the temperature treatment during the transverse orientation and the subsequent heat setting is usually sufficient to completely evaporate the solvent and to dry the coating.

For component I of the mixture, respectively blend of the adhesive layer, copolyesters are used which are produced by means of polycondensation of (α) isophthalic acid, (β) an aliphatic dicarboxilic acid with the formula $HOOC(CH_2)_n COOH$, with n being within the range from 1 to 11, (γ) a sulfomonomer containing an alkalimetal sulfonate group attached to the aromatic portion of an aromatic dicarboxilic acid and (δ) at least an aliphatic or cycloaliphatic alkylene glycol with 2 to 11 carbon atoms. The total amount of existing acid equivalents shall essentially correspond on a molar basis to the total amount of existing glycol equivalents.

Examples of sulfomonomers containing a metal sulfonate group on the aromatic portion of an aromatic dicarboxilic acid (component γ) are monomers of the following general formula:

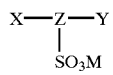

In this formula

M represents a monovalent cation of an alkali metal,

Z represents a trivalent aromatic radical

X and Y are carboxyl groups or polyester-forming equivalents.

Monomers of this kind are described in U.S. Pat. Nos. 3,563,942 and 3,779,993. Examples of such monomers are sodium-sulfoterephthalic acid, sodium-5-sulfoisophthalic acid, sodium-sulfophthalic acid, 5-(p-sodiumsulfophenoxy)-isophthalic acid, 5-(sodium-sulfopropoxy)-isophthalic acid and similar monomers as well as derivatives thereof capable of forming polyesters, such as dimethyl esters. M is preferably $Na^+$, $Li^+$ or $K^+$.

The term "derivatives capable of forming polyesters" is meant to encompass reactants which are capable of condensation reactions, especially ester interchange reactions, for forming polyester compounds. Among such groups are carboxylic groups as well as the lower alkyl esters thereof, e.g. dimethyl terephthalate, diethyl terephthalate and numerous other esters, halogenides or salts. Preference is given to the use of acid-monomers such as dimethyl ester, since this allows a better control of the condensation reaction.

It has turned out that the proportional presence of components $\alpha$, $\beta$, $\gamma$, and $\delta$, used for the production of the preferred copolyester coatings, is of vital importance if a coated film with satisfactory adhesion shall be produced. A minimum of about 65 mol % of isophthalic acid (component $\alpha$), for example, has to be present as acid component, related to component I. Preference is given to component $\alpha$ as a pure isophthalic acid which has to be present at a quantity of about 70 to 95 mol %. For component $\beta$ all acids of the above-mentioned formula achieve sufficiently good results with preference being given to adipic acid, azelaic acid, sebacic acid, malonic acid, succinic acid, glutaric acid and mixtures of these acids. The preferred quantity within the mentioned range is 1 to 20 mol % based on the acid components of the copolyesters if component $\beta$ is present in the composition. The monomer-forming component $\gamma$ of the preferred copolyester coating must be contained in this system at a minimum quantity of 5 mol % for the primer to be water-dispersable. The preferred quantity of monomers of component $\gamma$ is about 6.5 to 12 mol %. The glycol component ($\delta$) is present in about stoichiometric quantity.

For component II of the mixture respectively blend of the adhesive layer acrylic copolymers are used. The copolymers preferably used basically consist of a minimum of 50% by weight of one or more polymerised acrylic and/or methacrylic monomers and 1 to 15% by weight of a copolymerizable comonomer, which, once in a copolymerized state, is capable of forming intermolecular cross-linkings at elevated temperatures and, if desired, without use of an additional resinous cross-linking agent.

The acrylic component of the adhesive copolymers is preferably present in a quantity of 50 to 99% by weight and is preferably made from methacrylic acid ester, especially an alkyl ester, the alkyl group of which contains up to ten carbon atoms, such as a methyl-, ethyl-, n-propyl-, isopropyl-, n-butyl-, isobutyl, tertiary butyl-, hexyl-, 2-ethylhexyl-, heptyl- and n-octyl group. Acryl copolymers derived from a lower alcyl acrylate ($C_1$ to $C_4$), especially ethyl acrylate, when in combination with a lower alkyl methacrylate, yield an especially good adhesion of reprographic coatings and mat lacquers on the polyester film. Special preference is given to adhesive copolymers made from an alkyl acrylate, e.g. ethyl acrylate or butyl acrylate, when in connection with an alkyl methacrylate, e.g. methyl methacrylate, especially when used in equimolar proportions and at a total quantity of 70 to 95% by weight. The acrylate comonomer of such acrylic/methacrylic combinations is preferably present in a proportion of 15 to 65 mol %, and the methacrylate comonomer is preferably present in a proportion which is generally by 5 to 20 mol % higher than the one of the acrylate comonomer. The combination preferably contains a proportion of 35 to 85 mol % of the methylacrylate.

In order to increase the solvent stability comonomers capable of forming cross-linkings can optionally be used, such as N-methylolacrylamide, N-methylolmethacrylamide and the respective ethers, epoxy materials such as glycidyl acrylate, glycidyl methacrylate and allyl glycidyl ether; monomers containing carboxyl groups, such as crotonic acid, itaconic acid or acrylic acid; anhydrides, such as maleic acid anhydrides; monomers containing hydroxyl groups such as allyl alcohol and hydroxyethyl- or hydroxypropyl acrylate or -methacrylate; amides, such as acrylamide, methacrylamide or maleic acid amide and isocyanates, such as vinyl isocyanate or allyl isocyanate. Of all the cross-linked comonomers mentioned above preference is given to N-methylolacrylamide and N-methylolmethacrylamide, the reason being first of all that copolymer chains, containing one of these monomers, are capable of condensating with one another when under the influence of elevated temperatures, and are thus capable of forming the desired intermolecular cross-links. The optionally desired solvent stability of the favoured acrylate coating can, however, also be achieved by the presence of an extraneous cross-linking agent, such as a melamine- or a urea-formaldehyde-condensation product. Should no increased solvent stability be desired the use of cross-linking agents is not necessary.

The coating may be applied to one or both sides of the film. It is however possible to apply the coating according to the invention to just one side of the film and to supply the opposite side with a different coating. The composition of the coating may additionally contain conventional additives such as anti static agents, wetting agents, surfactants, pH regulators, antioxidants, pigments, anti blocking agents, e.g. colloidal $SiO_2$, etc. It is generally advisable to incorporate a surfactant in order to improve the wetting capacity of the aqueous coating towards the polyester carrier film.

Surprisingly it turned out that by the simple method of mixing coatings (components I and II), each for itself already known, a solution for the given problem was found. Initially one skilled in the art would have expected the film not to be steam-resistant due to the fact that the present component I for itself is not resistant to vapour. Surprisingly, this prejudice could be overcome by the present invention.

The invention also relates to a method for the production of the film according to the invention by coextrusion and subsequent biaxial orientation and heat setting. In the course of this procedure the polymer, respectively the polymer mixtures, for the individual layers, namely the base layer B and the cover layers A and C, are compressed and liquefied in extruders, where the polymer, respectively polymer mixture, may already contain the optional additives. The melts are then simultaneously extruded through a flat film die (slot die), and the extruded multi-layered melt is drawn off on one or more internally cooled take-off rollers with the melt cooling off to become a solid pre-film.

The biaxial orientation is usually performed sequentially. Preferably the pre-film is initially stretched longitudinally (i.e. in machine direction), and transversely stretched thereafter (i.e. vertically to machine direction). This leads to a spatial orientation of the polymer chains. The longitudinal stretching may be done by two rollers rotating at different speeds depending on the desired stretch ratio. For the transverse stretching process a suitable tenter frame is generally used, wherein the film is attached to both rims and then stretched horizontally at elevated temperatures.

The temperature at which the orientation is performed may vary within a relatively wide range and depends on the desired properties of the film. As a rule, the longitudinal orientation is performed at a temperature ranging from 80 to 130° C. and the transverse orientation within the range from 90 to 150° C. The length stretch ratio is generally within the range from 2.5:1 to 6:1, preferably from 3:1 to 5.5:1. The transverse stretch ratio generally lies within the range from 3.0:1 to 5.0:1, preferably from 3.5:1 to 4.5:1. After the longitudinal orientation and prior to transverse orientation an in-line coating is applied on one or both surface(s) of the film as previously described.

For the subsequent heat setting the film is kept at a temperature of 150 to 250° C. for a duration of 0.1 to 10 s. The film is wound up thereafter in the usual manner.

A special advantage of the invention is that the production costs of the film are only slightly above those of a film made from standard polyester raw materials. The other properties of the film according to the invention, related to its production and to its use basically remain unchanged or are even improved. Apart from that it is guaranteed that a proportion of up to 60% by weight, preferably of 10 to 50% by weight of the waste material resulting from the film production, based individually on the total weight of the film can be used as regrind for the film production without noticeably affecting the physical properties of the film.

The film is outstandingly well-suited for the packaging of food and other consumable items which are sensitive to moisture and/or air. It is especially suitable for the production of so-called "bag-in-box"-packaging of liquids and other products which can be poured.

The following table (Table 1) summarizes the most important film characteristics.

TABLE 1

| | ranges | | | |
|---|---|---|---|---|
| | general | preferred | especially preferred | unit |
| Film thickness | 3–300 | 4–250 | 5–200 | [μm] |
| Ratio Component I to Component II | 5:95–95:5 | 10:90–90:10 | 15:85–85:15 | [% by weight] |
| Metal adhesion prior to sterilization | >2.5 | >3.0 | >3.5 | [N/25 mm] |
| Metal adhesion after sterilization | >2.0 | >2.5 | >3.0 | [N/25 mm] |

In order to characterize the raw material and the films, the following methods were used:

Solution Viscosity (SV-value)

The standard viscosity SV (DCE) is measured in accordance with DIN 53726 in dichloro acetic acid. Determination of the intrinsic viscosity (IV) is based on the standard viscosity as follows:

$$IV(DCE) = 6.907 \times 10^{-4} \, SV(DCE) + 0.063096$$

Metal Adhesion

The film sample (300 mm long×180 mm wide) according to the invention is placed on a piece of smooth cardboard (200 mm long×180 mm wide, about 400 g/m², bleached, outer layers painted) prior to bonding, the protruding film edges are to be folded back and to be fixed with adhesive tape.

The bonding of the film according to the invention to a standard polyester film with a thickness of 12 μm (e.g. Melinex 800) is performed with a doctor coater and doctor blade No. 3 of Erichsen Corp., where about 1.5 ml of adhesive (Novacote NC 275+CA 12, mixture ratio: 4/1+7 parts of ethyl acetate) is applied to cover layer A of the film according to the invention. After the solvent has evaporated the standard polyester film is laminated onto cover layer A of the film according to the invention using a metal roller (width 200 mm, diameter 90 mm, mass 10 kg, in accordance with DIN EN 20 535). Required parameters for the lamination are as follows:

| | |
|---|---|
| Quantity of adhesive: | 5 +/− 1 g/m² |
| Ventilation time after applying the adhesive: | 4 min +/− 15 s |
| Doctor coating thickness (Erichsen): | 3 |
| Speed level of the doctor blade: | about 133 mm/s |
| Curing time of the compound: | 2 hrs at 70° C. in a circulating air oven |

By means of a 25+/−1 mm slitter, samples are taken, each about 100 mm long. For this purpose about 50 mm of compound and 50 mm of non-bonded single layers are required for fixation/fitting of the test object. The test objects are to be fixed with the entire surface of the back side of the film according to the invention (base layer B or cover layer C) to a carrier sheet metal by means of a double-faced adhesive tape. The sheet metal with the attached compound is to be fixed to the lower clamp of the tensile-strength tester. The clamp distance is 100 mm. The non-laminated end of the standard polyester film has to be fixed to the upper clamp of the tensile-strength tester (e.g. Instron, Zwick) in such a manner that a peeling angle of 180° results. The average peeling force is stated in N/25 mm, rounded to the first digit after the decimal.

| | |
|---|---|
| Sample width: | 25 mm |
| Pre force: | 0.1 N |
| Measuring distance: | 25 mm |
| Take-up velocity to pre-force: | 25 mm/min |
| Pre-distance: | 5 mm |
| Testing distance: | 40 mm |
| Sensitivity: | 0.01 N |
| Take-up velocity: | 100 mm/min |

The result of the measurement of the peeling force corresponds to the minimal adhesive force present between the layers, since the adhesive force of the adhesive to the standard film is considerably greater.

Sterilizeability

In order to determine the sterilizeability the film is exposed to a water vapour jet for a time period of 10 s at a temperature of 100° C. Thereafter the metal adhesion is determined as described above.

The following Examples describe the invention.

EXAMPLE 1

The adhesive layer was made from components I and II as follows:

Component I for the coating mixture according to the invention: A copolyester with about 90 mol % of isophthalic acid and 10 mol % of the sodium salt of 5-sulfoisophthalic acid as acid component and 100 mol % of ethylene glycol as glycol was produced according to the following method:

A stainless steel reaction vessel with a volume of 2 l equipped with an anchor agitator, a thermoelement for measuring the temperature of the contents of the container, an 18-inch Claisen/Vigreux distillation unit with condenser and receiver, an inlet and a heating jacket was preheated to 190° C., rinsed with nitrogen and filled with 1065.6 g of dimethyl isophthalate, 180.6 g of dimethyl-5-sulfoisophthalate-sodium salt and 756.9 g of ethylene glycol. In addition, a buffer ($Na_2CO_3 \times 10\ H_2O$–0.439 g) and an ester interchange catalyst ($Mn(OAc)_2 \times 4\ H_2O$–0.563 g) were placed in a vessel. The mixture was heated while constantly stirring it, distilling off methanol. During distillation the temperature of the vessel was gradually increased to 250° C. When the weight of the distillate corresponded to the theoretical methanol output, an ethylene glycol solution with a content of 0.188 g of phosphorous acid was added. The distillation unit was then replaced with a curved steam exhaust with receiver. 20 g of pure ethylene carbonate were added to the reaction mixture which was immediately followed by a violent gas eruption ($CO_2$). This $CO_2$ development ceased after about 10 min. A vacuum of 240 mm Hg was then applied and the polycondensation catalyst (0.563 g of $Sb_2O_3$) in form of an ethylene glycol suspension was added. The reaction mixture was stirred for 10 min while the vacuum of 240 mm Hg was maintained, whereafter the pressure was further reduced in steps of 10 mm Hg/min from 240 mm Hg to 20 mm Hg. As soon as the vacuum within the system had been reduced to 20 mm Hg the vessel temperature was increased at a rate of 2° C./min from 250° C. to 290° C. Upon reaching a temperature of 290° C. the stirring speed was throttled back and the pressure reduced to a maximum of 0.1 mm Hg. At this time an ammeter reading of the stirrer motor was taken. The viscosity of the polymer was controlled by performing the polycondensation in accordance with fixed values of the change of the ampere-value of the stirrer motor of (individually) 2.3 A. After reaching the desired molecular weight the vessel was pressurized with nitrogen in order to extrude the liquid polymer through the bottom outlet of the vessel into a chilling bath of ice water.

An aqueous dispersion with 4.5% by weight was made from the produced copolyester while constantly stirring at a temperature of about 90° C., which was cooled down to room temperature and filtered after the copolyester had completely dispersed.

Thereafter 0.85% by weight of a 50% aqueous dispersion of colloidal $SiO_2$ were added under constant stirring.

Component II for the coating mixture according to the invention contains 4.5% by weight of a latex solution consisting of a copolymer made from 60% by weight of methyl methacrylate, 35% by weight of ethylacrylate and 5% by weight of N-methylolacrylamide and of a tenside.

The aqueous solutions of components I and II were mixed at equal proportions and stirred.

At the same time chips made from polyethylene terephthalate were dried to a residual moisture of less than 50 ppm at a temperature of 160° C. and fed to the extruder for base layer B. In the same manner chips made from polyethylene terephthalate and a filler were fed to the extruder for cover layers A and C. By coextrusion and subsequent step-wise orientation in longitudinal direction a uniaxially-oriented film was obtained, which was corona-treated and coated with the dispersion previously described by means of the reverse gravure method, with the dry weight of the coating being about 0.035 g/m² (related to the biaxially oriented film). The film longitudinally oriented in that manner was then transversely oriented to result in a transparent three-layered film with an ABC structure and a total thickness of 12 μm. The cover layers each had a thickness of 1.5 μm.

| Base layer B: | |
|---|---|
| 100% by weight | polyethylene terephthalate (RT 49, KoSa, Offenbach, Germany) with a SV-value of 800 |
| Cover layers A and C: | |
| 90% by weight | polyethylene terephthalate (RT 49, KoSa) with a SV-value of 800, and |
| 10% by weight | masterbatch of 99% by weight of polyethylene terephthalate and 1.0% by weight of silicic acid particles (®Sylobloc 44 H, Grace) with an average particle size of 4.5 μm. |

The individual process steps were as follows:

| Extrusion | Temperatures | Cover layer: | 300° C. |
|---|---|---|---|
| | | Base layer: | 300° C. |
| | Slot die width: | | 1 mm |
| | Temperature of the take-off roller | | 30° C. |
| Longitudinal orientation | Temperature: | | 85–135° C. |
| | Length stretch ratio: | | 4.0:1 |
| Transverse orientation | Temperature: | | 85–135° C. |
| | Transverse stretch ratio | | 4.0:1 |
| Setting | Temperature: | | 230° C. |
| | Duration | | 3 s |

As a result a sterilizable film with good metal adhesion was obtained, the characteristics of which are shown in Table 2.

EXAMPLE 2

In analogy to Example 1 a three-layered film with a total thickness of 12 μm was produced by way of coextrusion. Only the composition of the aqueous solution of the adhesive layer was changed:

| Adhesive layer: | |
|---|---|
| 60% by weight | aqueous solution of component I and |
| 40% by weight | aqueous solution of component II. |

EXAMPLE 3

In analogy to Example 1 a three-layered film with a total thickness of 12 μm was produced by way of coextrusion. Only the composition of the adhesive layer was changed:

| Adhesive layer: | |
|---|---|
| 40% by weight | aqueous solution of component I and |
| 60% by weight | aqueous solution of component II. |

Comparative Example 1

Example 1 of EP 0 144 978 was repeated. The monolayered film had a total thickness of 75 μm and was coated with 100% by weight of component I. This film had good metal adhesion, it was, however, not steam-sterilizable.

Comparative Example 2

Example 1 of EP 0 144 978 was repeated. The monolayered film had a total thickness of 75 μm and was coated with 100% by weight of component II. This film had poor metal adhesion.

TABLE 2

| Example No. | Mixing proportion K I:KII of the adhesive layer | Film thickness [μm] | Thickness of cover layers [μm] | Film structure | Metal adhesion [N/25 mm] | Metal adhesion after sterilization [N/25 mm] |
|---|---|---|---|---|---|---|
| 1 | 50:50 | 12 | 1.5/1.5 | ABC | 30 | 29 |
| 2 | 60:40 | 12 | 1.5/1.5 | ABC | 33 | 33 |
| 3 | 40:60 | 12 | 1.5/1.5 | ABC | 27 | 25 |
| CE1 | 100:0 | 75 | -/- | B | 35 | 50 |
| CE2 | 0:100 | 75 | -/- | B | 30 | 30 |

What is claimed is:

1. Hot-sterilizable, biaxially oriented polyester film with good metal adhesion, with a base layer B containing at least 80% by weight of thermoplastic polyester, and with at least one adhesive layer which contains a mixture or a blend of two components I and II, wherein component I of the mixture or the blend contains a polyethylene terephthalate copolymer, which consists of the condensation product of the following monomers, or of the polyester forming equivalents thereof:

A) 65 to 95 mol % of isophthalic acid;
   B) 0 to 30 mol % of at least one aliphatic dicarboxilic acid of the formula $HOOC(CH_2)_nCOOH$, wherein n ranges from 1 to 11;
   C) 5 to 15 mol % of at least one sulfomonomer containing an alkali metal sulfonate group attached to the aromatic portion of a dicarboxilic acid;
   D) the stoichiometric quantity of a copolymerizable aliphatic or cycloaliphatic glycol having 2 to 11 carbon atoms, required for forming 100 mol % of the condensation product, where the indicated percentages are individually based on the total quantity of monomers which form the polyester coating;

and wherein component II of the mixture or the blend contains acrylic copolymers made of at least 50% by weight of one or more polymerizable acrylic or methacrylic or acrylic and methacrylic monomers, and 1 to 15% by weight of a copolymerizable comonomer, which in the copolymerized state is capable of forming intermolecular links at elevated temperatures.

2. Hot-sterilizable polyester film as claimed in claim 1, wherein the weight ratio of components I and II is within the range from I:II=5:95 to I:II=95:5.

3. Hot-sterilizable polyester film as claimed in claims 1, wherein the film has a three-layered structure and contains, apart from the base layer B, two additional cover layers A and C, each on opposing sides of base layer B.

4. Hot-sterilizable polyester film as claimed claim 1, wherein the film has a total thickness within the range from 4 to 300 μm, with the base layer B contributing 40 to 95% to the total thickness.

5. Hot-sterilizable polyester film as claimed in claim 1, wherein the adhesive layer has a thickness within the range from 5 to 2000 nm, and wherein it is applied to one or both surfaces of the film in the form of a diluted solution, suspension or dispersion.

6. Hot-sterilizable polyester film as claimed in claim 1, wherein the film is metallized or coated with $SiO_x$ or $Al_xO_y$ at least on one of the surfaces.

7. Process for the production of a film as claimed in claim 1, wherein the polymer, for layer B is compressed and liquefied to form a melt, wherein the melt is then extruded through a flat-film die, and the extruded melt is drawn off to form a pre-film, the pre-film is then stretched longitudinally and then transversely, and wherein one surface or both surfaces of the film is or are in-line coated with an adhesive layer composition after the length stretching and before the transverse stretching, wherein the adhesive layer containing a mixture or a blend of two components I and II wherein component I of the mixture or the blend contains a polyethylene terephthalate copolymer, which consists of the condensation product of the following monomers, or of the polyester forming equivalents thereof:

A) 65 to 95 mol % of isophthalic acid;
   B) 0 to 30 mol % of at least one aliphatic dicarboxilic acid of the formula $HOOC(CH_2)_nCOOH$, wherein n ranges from 1 to 11;
   C) 5 to 15 mol % of at least one sulfomonomer containing an alkali metal sulfonate group attached to the aromatic portion of a dicarboxilic acid;
   D) the stoichiometric quantity of a copolymerizable aliphatic or cycloaliphatic glycol having 2 to 11 carbon atoms, required for forming 100 mol % of the condensation product, where the indicated percentages are individually based on the total quantity of monomers which form the polyester coating;

and wherein component II of the mixture or the blend contains acrylic copolymers made of at least 50% by weight of one or more polymerizable acrylic or methacrylic or acrylic and methacrylic monomers, and 1 to 15% by weight of a copolymerizable comonomer, which in the copolymerized state is capable of forming intermolecular links at elevated temperatures.

8. Process as claimed in claim 7, wherein after transverse stretching the film is thermofixed at a temperature ranging from 150 to 250° C. over a time period of 0.1 to 10 s.

* * * * *

UNITED STATES PATENT AND TRADEMARK OFFICE
CERTIFICATE OF CORRECTION

PATENT NO. : 6,617,035 B2
DATED : September 9, 2003
INVENTOR(S) : Herbert Peiffer, Stefan Bartsch and Richard Lee Davis It is certified that error appears in the above-identified patent and that said Letters Patent is hereby corrected as shown below:

<u>Title page</u>,
Item [56], References Cited, U.S. PATENT DOCUMENTS, insert:

| | | | |
|---|---|---|---|
| -- 3,563,942 A | 02/1971 | Helberger | |
| 3,779,993 A | 12/1973 | Kibler et al. | |
| 4,493,872 | 01/1985 | Kibler et al. | 428/332 |
| 4,571,363 | 02/1985 | Culbertson et al. | 428/332 |
| 4,880,700 | 11/1989 | Charmot et al. | 428/337 |
| 4,921,764 A * | 05/1990 | Rudd et al. | 428/480 |
| 6,214,440 B1 * | 04/2001 | Peiffer et al. | 428/336 |
| 6,358,604 * | 03/2002 | Peiffer et al. | 428/336 |
| 2002/0106506 A1* | 08/2002 | Kumano et al. | 428/343 -- |

Signed and Sealed this

First Day of March, 2005

JON W. DUDAS
*Director of the United States Patent and Trademark Office*